United States Patent [19]
King et al.

[11] 3,893,019
[45] July 1, 1975

[54] VARIABLE POWER CONTROL ADAPTER

[75] Inventors: John A. King; Donald L. Brown, both of Dallas, Tex.

[73] Assignee: Texas Instruments Incorporated, Dallas, Tex.

[22] Filed: July 9, 1971

[21] Appl. No.: 161,945

Related U.S. Application Data

[63] Continuation of Ser. No. 10,088, Feb. 16, 1970, abandoned, which is a continuation of Ser. No. 615,948, Feb. 14, 1967, abandoned.

[52] U.S. Cl. .................. 323/19; 315/196; 315/208; 315/251; 323/24; 323/36
[51] Int. Cl. ..................... G05f 3/04; H05b 39/04
[58] Field of Search ..... 307/146; 313/318; 315/194, 315/196, 200 A, 208, 251, 272; 323/1, 4, 16, 19, 22 SC, 24, 34, 35, 36, 39; 338/70, 71, 72, 73, 219

[56] References Cited
UNITED STATES PATENTS

| | | | |
|---|---|---|---|
| 3,300,711 | 1/1967 | Duncan | 315/194 X |
| 3,331,013 | 7/1967 | Cunningham | 323/22 SC |
| 3,346,874 | 10/1967 | Howell | 323/39 UX |
| 3,379,871 | 4/1968 | Peek, Jr. | 338/70 X |
| 3,385,944 | 5/1968 | Mackiewicz et al. | 307/146 X |
| 3,392,626 | 7/1968 | Miller et al. | 315/194 X |

*Primary Examiner*—A. D. Pellinen
*Attorney, Agent, or Firm*—Harold Levine; Edward J. Connors, Jr.; Stephen S. Sadacca

[57] ABSTRACT

A power control adapter, which may be removably threadably disposed within a conventional electric lamp socket, connected to a source of electrical power. The adapter includes a housing, which extends integrally from the base member and supports an electrical socket, adapted to receive a load such as an incandescent electric light bulb. A power control circuit is carried within the housing, and provides selectively variable electrical communication between the load and the source of electrical power through the electric lamp socket. The electrical control circuit includes an externally adjustable potentiometer for varying the power level supplied to the load.

2 Claims, 5 Drawing Figures

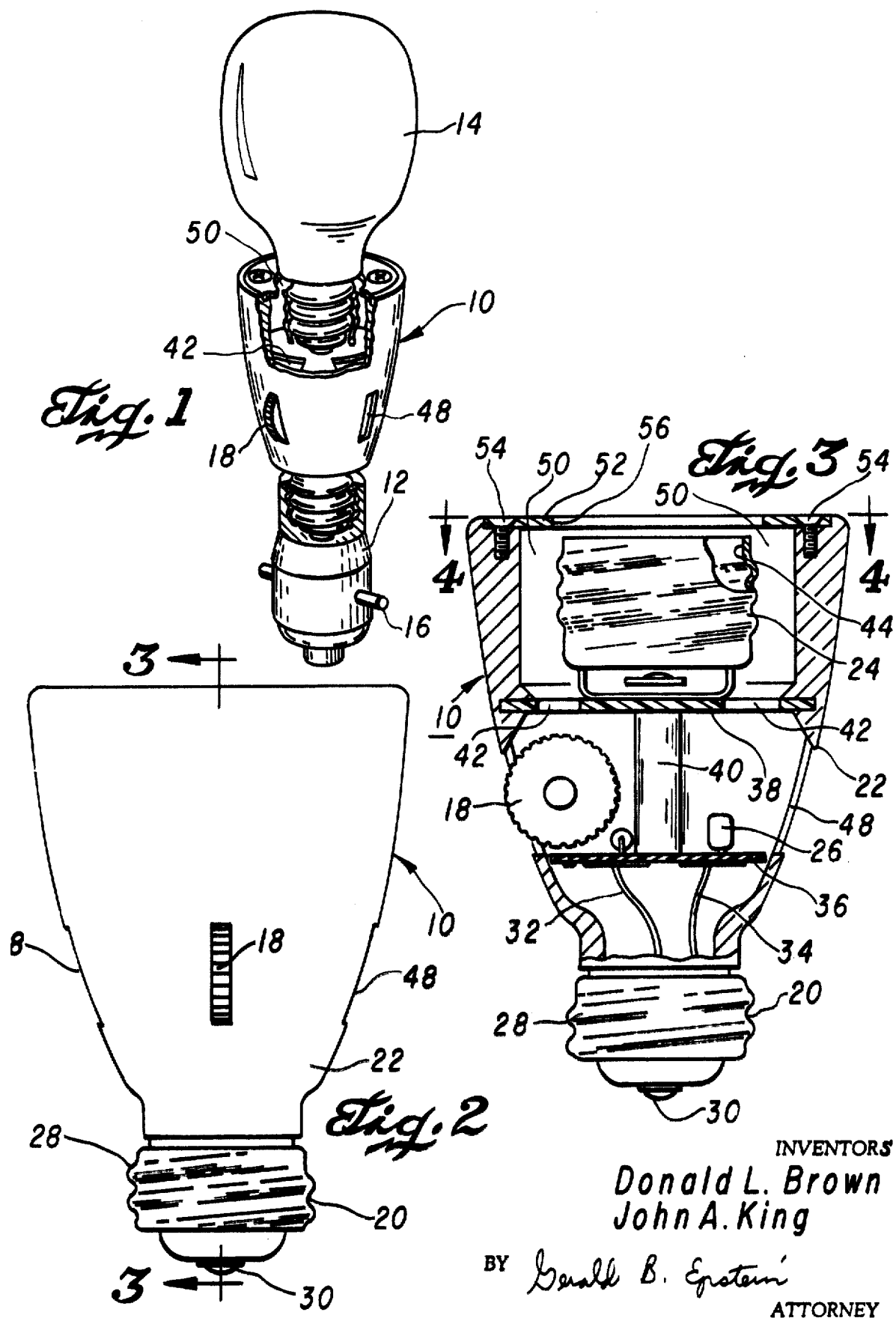

VARIABLE POWER CONTROL ADAPTER

This application is a continuation of U.S. Patent application, Ser. No. 10,088, filed Feb. 16, 1970 (now abandoned) which is a continuation of U.S. Patent application, Ser. No. 615,948, filed Feb. 14, 1967 (now abandoned).

BACKGROUND OF THE INVENTION

This invention relates generally to power control systems, and more particularly to a selectively adjustable adapter for use in conjunction with conventional lamp sockets and the like as a light intensity varying device.

Numerous devices have been proposed for use as light intensity varying devices or light dimmers for varying the power supplied to a conventional incandescent electric light bulb. Some of these devices have been extremely simple in design and relatively inexpensive, while others have been quite cumbersome and complex, often requiring skilled craftsmen for installation. Certain of such devices require substantially complete disassembly of the electrical socket portion of a conventional lamp socket, followed by rewiring of the socket in order to provide a light dimming control function, while others are relatively simple to install but are sorely lacking in durability and often may be hazardous in use. Such devices may incorporate various types of control circuits for varying the power supplied to the electric light bulb, which is generally threadably disposed within the rewired system.

Other proposals have involved the use of a separate external system, which incorporates suitable circuitry and is located intermediate the lamp socket and the source of electrical power, such as the conventional 115-volt 60-hertz, alternating current supplied at a household wall outlet. In such a device, commonly, the lamp line cord is disposed in electrical communication with the system, while the system is itself maintained in contact with the line power through the wall outlet. Such a system is quite limited in versatility and usefulness since it normally requires a bulky and rather unsightly enclosure. Also, such systems often lack suitable radio frequency suppression networks and consequently may cause substantial interference with radio and television receivers in the immediate vicinity. More importantly, such systems often have difficulty in obtaining Underwriters Laboratory approval because of the fact that the ultimate use of the system cannot be predicted with any degree of accuracy. For example, an unknowledgeable commercial user might attempt to connect a relatively high power device, such as an electric iron, requiring 1000 watts or more, into the system, which might only be suitable for handling the power levels ordinarily encountered when employing an ordinary incandescent electric light bulb, which might be of the order of 100–150 watts. Such misuse of this type of system could be quite dangerous and result in hazardous shock to the user of the device. Similarly, in situations where control devices were provided that required disassembly of the lamp socket in order to insert the dimmer control, an unknowledgeable user might again be subjected to the dangers of hazardous shock. In addition, there is always a risk present that the rewiring would be improperly done due to the lack of knowledge of the person installing the device, which again might result in substantial danger.

Other approaches to lamp dimming have involved the use of multiple switches in combination with a multiple filament incandescent electric light bulb. This type of arrangement is generally quite limited in usefulness, since the initial cost of such a light bulb is quite high and its lifetime may be somewhat limited due to the three-element construction of the bulb itself and the attendent likelihood that one or more elements of the bulb may burn out relatively quickly, thereby shortening the lifetime of the entire bulb. More importantly, such an arrangement has not been particularly satisfactory in most instances, since two or at most three levels of illumination are normally provided, in view of the difficulty in providing more than this number of elements within the bulb.

Thus, there is a substantial need for a relatively inexpensive, durable, and easily installed adapter system, which may be conveniently used in conjunction with already existing electric lamp sockets to provide continuously variable dimming or varying of the light intensity provided by a light bulb. There is a particular need for such a device which may be readily installed and removed by a person with no knowledge of electricity, other than that required for inserting an ordinary light bulb into a threaded electric lamp socket and removing the bulb, when desired. In addition, such a device should be substantially completely hazard-free during installation and use.

SUMMARY OF INVENTION CLAIMED

A power control device, particularly suitable for use as an adapter to be removably disposed within a conventional electric lamp socket for varying the power supplied to an incandescent electric light bulb removably disposed in electrical communication with the power control device; the device including a base member suitable for disposition in electrical communication with an electrical switch, such as a conventional lamp socket, a housing dpending from the base member, an electrical socket supported within the housing, and arranged to receive a load, such as a standard incandescent electric light bulb, and a selectively adjustable electrical control circuit also supported within the housing and serving to provide selectively variable electrical communication between a source of electrical power and the load by varying the electrical power which is supplied to the load in accordance with preselected adjustment of the electrical control circuit.

BRIEF DESCRIPTION OF THE DRAWINGS

FIG. 1 is a perspective view, partially cut away, of power control device in accordance with the principles of the present invention, shown together with a conventional electric lamp socket and a conventional incandescent electric lamp bulb;

FIG. 2 is an end elevational view of the power control device of FIG. 1;

FIG. 3 is a vertical sectional view taken generally along the line 3—3 of FIG. 2, illustrating certain of the features of the device;

DESCRIPTION OF PREFERRED EMBODIMENT

Figure 4:
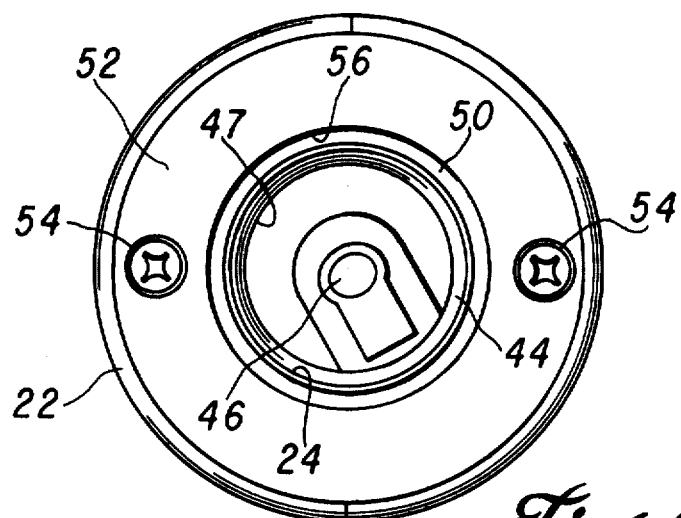
FIG. 4 is a view taken generally along 4—4 of FIG. 3, particularly illustrating certain structural details of the power control device of the present invention; and, FIG. 5 is a schematic electrical circuit diagram of a preferred embodiment of an electrical control circuit suitable for use in the power control device of the present invention.

Referring generally to the drawings, a power control device or adapter is designated generally by the reference numeral 10. The adapter 10 is particularly advantageous for use in varying the intensity of illumination of a conventional incandescent electric light bulb. Accordingly, the adapter is illustrated in FIG. 1 in one of its preferred ultimate uses, removably disposed within a conventional electric lamp socket or switch 12 with a conventional incandescent, electric light bulb 14 threadably disposed in electric communication with the adapter. As further shown in FIG. 1, the electric lamp socket includes a conventional switch control 16, for selectively connecting a source of alternating current electrical power (not shown) to the adapter. In addition, a control knob or thumbwheel 18 is suitably supported by the adapter structure, and is arranged to vary the level of power supplied to the light bulb, disposed within the adapter, in a manner to be described hereinafter.

Referring in detail to FIGS. 2 through 4, the adapter structure illustrated generally includes a base member 20, a housing 22, which in the illustrated embodiment depends vertically upwardly from the base member, a socket member 24, supported within the housing, and an electrical control circuit 26 similarly supported within the housing. The control circuit 26 is preferably disposed intermediate the base member 20 and the socket 24 for providing selectively variable electrical communication between the base member 20, which is generally intended to be maintained in electrical communication with the source of electrical power through means, such as the switch 12, and the socket 24, which is adapted to receive a load such as the light bulb 14.

The base member 20, as illustrated, comprises a conventional so-called Edison base or medium base type of structure, which is ordinarily used in standard incandescent electric light bulbs. Such a configuration is particularly advantageous, since it permits the adapter to be conveniently threadably disposed within a conventional electric lamp socket which, as previously mentioned, is intended to be one of its uses. The base member 20 includes an exterior portion 28, which may comprise a threaded aluminum ring swaged about its periphery. The exterior portion 28 functions as one of the electrical contacts to the adapter, while another electrical contact 30 is shown at the outwardly projecting end of the base member, and is in electrical communication with the interior of the base. These contacts in turn provide electrical communication between the electric lamp socket 12 and the control circuit 26, which is then adjusted to vary the power to be supplied to the load 14. As shown in FIG. 3, electrical communication between these contacts and the electrical control circuit 26 is provided by a pair of conductors 32 and 34, although such interconnection may also be achieved in any suitable conventional manner.

Referring in particular to FIG. 3, it may be seen that the electrical control circuit 26 is preferably carried on a printed circuit board 36, which is suitably supported within the housing 22 and is electrically coupled to the base member 20 by the conductors 32 and 34. The thumbwheel 18 is also supported within the housing 22 adjacent the electrical control circuit 26, and coupled thereto for varying the conductive condition of the control circuit and, consequently, adjusting the power supplied to the load, as subsequently explained.

A supporting plate 38 is also provided within the housing 22, and is vertically spaced upwardly from the printed circuit board 36 which carries the control circuit. The supporting plate 38 is horizontally disposed and serves to supportingly carry the socket means 24, which, in turn is arranged to receive the load 14. The supporting plate is preferably fabricated of an insulating material, such as ceramic material, and is mechanically coupled to the printed circuit board 36 by the provision of a connecting member 40, which extends through the supporting plate 38 and rigidly secures the socket 24 and the printed circuit board 36 in position, as shown in FIG. 3. The supporting plate 38 is also provided with a plurality of ventilating slots 42, which serve to permit heat to rise through the housing 22 and exit through its open end to thereby dissipate into the ambient environment.

The socket member 24 is provided with an interiorly threaded portion 44, which is particularly adapted to receive the exteriorly threaded base portion of a conventional incandescent electric light bulb. In this connection, the socket member 24 is preferably provided with suitable conventional electrical contacts 46, 47 (see FIG. 4), similar to those ordinarily provided in a conventional electric lamp bulb socket, one contact being provided by the interior threaded portion 44 and the other contact being provided at the base of socket member 24, with the contacts being interconnected with the control circuit 26 in a conventional manner. These contacts are also shown schematically in the schematic circuit diagram of FIG. 5. Accordingly, when a conventional incandescent electric light bulb is threadably disposed within the socket 24, electrical communication is provided with the electrical control circuit 26, which selectively couples the lamp bulb to the source of electrical power through the lamp switch control 16.

The housing 22 which supports the previously described elements is arranged in a generally conical shape, and tapers outwardly as it extends from the base member 20. Consequently, the housing 22 includes a relatively narrow neck portion integrally connected to the base, and broadens outwardly to define a relatively wide opposite open end adjacent the socket 24. As shown in FIGS. 1–3, particularly, the housing is substantially wider adjacent its open upper end so as to conveniently accomodate the socket 24 in a position adjacent this open upper end, and further to permit the socket to readily receive the load 14. At the same time, the housing 22 is shaped to narrow gracefully as it extends toward the base member so as to conveniently connect therewith and provide an attractive design suitable for use within the home.

The wall of the housing 22 is of a suitable thickness and structural strength to adequately support the elements carried therein. The housing is preferably fabricated of a suitable insulating material, which is relatively inexpensive and relatively insensitive to heat, since substantial amounts of heat may be produced in its vicinity, during operation of the control circuit as well as during operation of the electrical light bulb. One particularly suitable form of material which may be conveniently provided comprises polystyrene.

To aid in dissipating heat from the device a plurality of relatively narrow slots 48 are provided at suitable locations about the periphery of the housing 22 in order to permit air to flow into the housing, as well as to permit heat to be dissipated through these slots. These slots are arranged in aligned, spaced relationship about the periphery of the housing at locations adjacent the portion of the housing in which the control circuit 26 is disposed. These slots 48 cooperate with the slots 42 and with an annular passageway 50 defined within the upper portion of the housing intermediate the socket 24 and the wall of the housing to permit ambient air to flow into the housing through the slots 48 and to pass upwardly through the slots 42 and the passageway 50, exiting through the open end of the housing. In this connection, it may be seen that the slots 48 and 42 cooperate with the passageway 50 to form a chimney-like action to transfer the heat, resulting from the operation of the control circuit by providing a constant flow of ambient air, passing across the control circuit and flowing outwardly through the open end of the housing 22.

In order to aid in providing increased structural rigidity for the housing 22, as well as to facilitate manufacturing the housing in several sections, if desired, with such sections being adapted to be subsequently rigidly secured together, a cover plate 52 is disposed on the open upper end of the housing 22, and is rigidly secured in position. The cover plate 52 is rigidly coupled to the housing 22 by the provision of suitable set screws 54, which extend through the cover plate and into the lip of the housing. The cover plate 52 is generally in the form of a ring which, when disposed in position, extends from a location adjacent the outer edge of the housing 22 inwardly a predetermined distance. The inner edge 56 of the cover plate 52 terminates at a position spaced slightly outwardly from the socket 24 so as to preclude interference with the passage 50. In addition, since the upper end of the socket 24 terminates adjacent the open upper end of the housing 22, when a lamp bulb is threadably disposed within the socket 24, a certain amount of clearance still exists between the inner edge 56 of the cover plate 52 and the lamp bulb.

Figure 5:
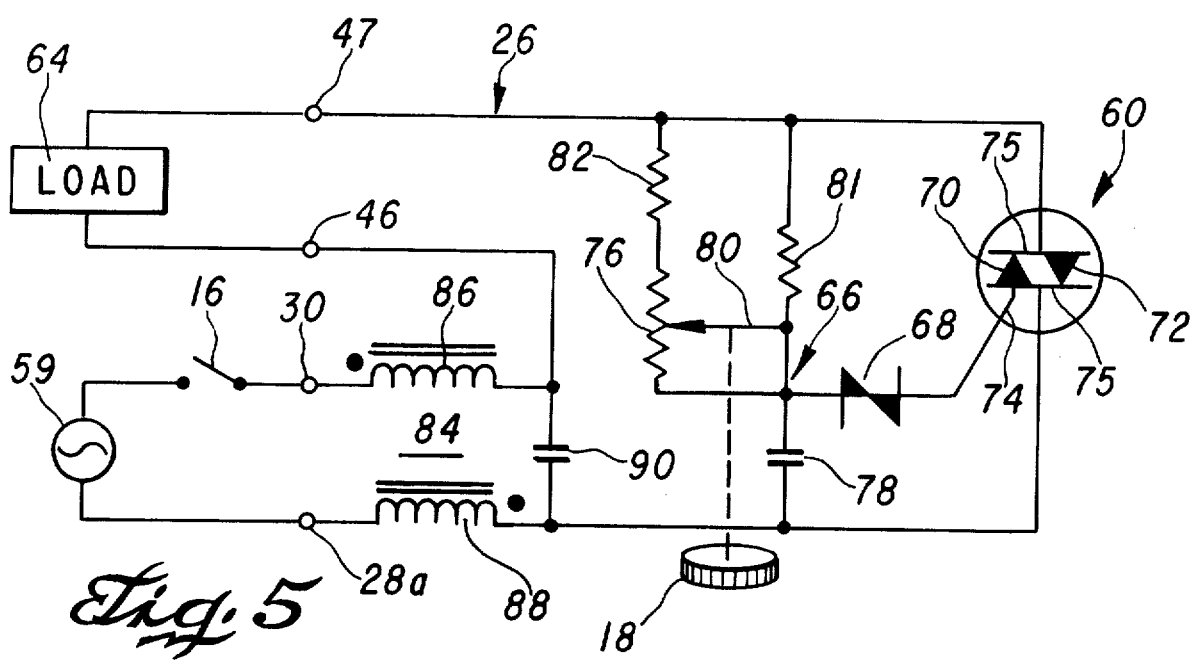

Referring now in detail to FIG. 5, a preferred embodiment of the control circuit 26, which is disposed within the housing 22, as previously described, is illustrated. The control circuit is connected to a source of alternating current electrical power 59 through the contact 30 and through the electrical contact provided by the exterior portion 28 of the base member 20 shown schematically as an electrical contact 28a, when the switch control 16 of the electrical lamp socket 12 is closed. The control circuit 26 generally comprises a bidirectional power control device 60, which is serially connected between the source of electrical power 59 and a load 64, which may comprise the electric lamp bulb 14. The bidirectional power control device 60 is arranged to adjust the power level supplied to the load 64 in accordance with its conductive condition. Control of the power control device 60 is effected by a selectively variable power level varying means 66, which controls the conductive condition of the power control device 60 by adjusting the point in the cycle of the A.C. line voltage at which control signals are supplied to the power control device to affect its state of conduction. The power level varying means 66 is coupled to the power control device 60 through a bidirectional trigger means 68, which supplies the requisite electrical control signals to the power control device in accordance with the adjustment of the power level varying means. Selective adjustment of the power level varying means is effected by suitable manipulation of the adjusting thumbwheel 18 coupled thereto, as shown.

The bidirectional power control device 60 preferably comprises a symmetrical, bidirectional thyristor, which functions analogeously to a pair of silicon controlled rectifiers connected in a back-to-back arrangement in an inverse parallel relationship so as to permit full wave control of the alternating current power supplied to the load 64. In this connection, the bidirectional power control device 60 is a semiconductor device, which may be triggered in either of two opposite directions, i.e., it may be triggered by either positive or negative gate pulses, having the requisite current level. Thus, the bidirectional thyristor 60 is fired or rendered conductive in response to both positive and negative trigger pulses, and may be arranged to be triggered at a desired current level to provide efficient full wave control of the power supplied to the load. Preferably, the bidirectional thyristor 60 is fabricated on a single wafer of semiconductor material, and includes a first anode 70, a second anode 72, and gate electrode 74. The bidirectional thyristor 60 also includes a pair of internally, electrically interconnected cathodes 75. By virtue of fabricating the bidirectional thyristor on a single wafer of semiconductor material with a single gate electrode, the bidirectional thyristor has substantially similar electrical characteristics in either direction and consequently conducts at substantially the same output level in both directions in response to positive or negative gate pulses of the requisite current level. Such a provision is quite advantageous in supplying a relatively steady power level to the load 64 and precludes the occurrence of flickering, for example, which might occur in the absence of such a provision.

The selectively adjustable power level varying means preferably comprises a selectively adjustable R-C network which is coupled between the gate electrode 74 of the bidirectional thyristor 60 and the source of power 59 through the triggering means 68. The selectively adjustable R-C network 66 functions as a phase shifting network for controlling the point in the cycle of applied line voltage at which a gating pulse is applied to the bidirectional thyristor 60 to effect conduction thereof and thereby control the power applied to the load 64. The R-C network 66 comprises a variable resistance or potentiometer 76, which is coupled to a capacitor 78 through a movable wiper arm 80. The wiper arm 80 is varied in its position on the potentiometer 76 by manipulation of the adjusting wheel 18 to vary the resistance component of the R-C phase delay network 66. Since the electrical gating signal appearing at the output of the R-C network 66 is coupled to the gate electrode 74 to control the conduction of the bidirectional thyristor, by varying the resistance of potentiometer 76, the phase of this gating signal is controllably varied, thereby controlling the conduction of the bidirectional thyristor 60, and, consequently varying the power level supplied to the load 64.

In the preferred embodiment of the control circuit 26, the minimum power position produces a light level somewhat above the zero level. Accordingly, when the switch 16 is closed and the potentiometer is adjusted to its maximum resistance position, the phase delay of gating signals is at a maximum, and a relatively low power signal is applied to the load 64. Accordingly, a predetermined, relatively low level of light intensity results, when the load comprises a light bulb. It is possible to then vary the power supplied to the load and, thus, the light intensity by merely varying the resistance of the potentiometer 76 by manipulation of the thumbwheel 18. In this connection, if desired, a trim resistor 81 may be connected across the potentiometer 76, as shown. The resistance value of the trim resistor 81 is selected in accordance with the maximum resistance value of the potentiometer 76 so that a desired level of phase delay and consequently a desired level of minimum light intensity is provided at the maximum resistance level setting of the potentiometer 76 by suitable selection of the resitance of the trim resistor. Similarly, the device generally includes an automatic memory, since often after the desired level of illumination has been achieved by suitable adjustment of the potentiometer 76, it may be desired to open the switch to disrupt power to the load. But, when the switch is later closed, and power is again supplied, the previously set illumination level is automatically achieved, since opening and closing of switch 16 does not affect the setting of potentiometer 76.

As shown in FIG. 5, the adjusting wheel 18 is mechanically coupled to the wiper arm 80 so as to precisely control the position of the wiper arm and thereby effect control of the phase of electrical signals applied to the bidirectional thyristor 60. In addition, a relatively small resistance current limiting resistor 82 is preferably provided, and is connected between the potentiometer and the load 64, as shown, so as to preclude substantially complete removal of resistance from the R-C network 66, when the potentiometer 76 is adjusted to a position of minimum resistance. Such a removal of resistance would be undesirable, in the illustrated embodiment in view of the potential harm which might result to the circuit. Consequently, when the wiper arm 80 is in a position to provide minimum resistance, i.e., adjacent the junction of the potentiometer 76 and the current limiting resistor 82, a small resistance is, nevertheless, still provided on the R-C phase delay network 66 by the resistor 82. When the potentiometer is adjusted to provide minimum resistance in the R-C phase delay network 66, the delay provided is at its lowest level. Consequently, the conduction of the bidirectional thyristor is at a relatively high level and the power supplied to load 64 is at a relatively high level, resulting in maximum light intensity.

However, as the wiper arm 80 is moved away from the junction of potentiometer 76 and the current limiting resistor 82, the resistance component of the R-C phase delay network 66 increases and correspondingly its phase delay effect increases in proportion to the increased resistance, i.e., there is an increasingly greater phase delay of the signals applied to the gate electrode 74, with respect to the A.C. line power. Accordingly, as the resistance of the R-C phase delay network 66 increases in response to increased potentiometer resistance the level of conduction of the bidirectional thyristor 60 decreases due to the increased phase delay of control signals applied to its gate electrode 74 and, correspondingly, the power supplied to the load 64 decreases. When the wiper arm 80 reaches the position of maximum resistance, maximum phase delay is provided so that the bidirectional thyristor 60 is maintained at its minimum firing level, and minimum power is supplied to the load 64, with this minimum power level depending on the resistance of trim resistor 81, as previously explained. Consequently, minimum illumination intensity is provided under these circumstances when the load 64 comprises a light bulb.

The bidirectional trigger means 68 which couples the output of the R-C phase delay network 66 to the control element or gate electrode 74 preferably comprises a bidirectional triggering diode, which serves as a voltage sensitive switch. The bidirectional trigger diode is preferably fabricated on a single wafer of semiconductor material and functions similarly to a pair of diodes serially connected in back-to-back relationship and arranged to break down in either the positive or negative direction in response to the application of a voltage signal of a predetermined magnitude. The bidirectional trigger diode triggers or breaks down regardless of the direction of the applied voltage, and is particularly suitable for use as a trigger device in conjunction with the bidirectional thyristor 60. In operation, when the time delayed signal supplied from the R-C phase delay network 66 to the trigger diode 68 is in excess of a predetermined voltage level, it effects breakdown of the trigger diode in either the positive or negative direction, depending on the polarity of the applied signal, and causes a gating pulse or trigger pulse to be applied to the gate electrode 74 of the bidirectional thyristor 60, which in turn, results in rendering the bidirectional thyristor conductive and causes power to be supplied to the load 64, in the manner previously explained.

In order to effect the suppression of undesirable radio frequency interference, which might occur due to the switching functions effected by the control circuit 26, a suitable filter circuit 84 is provided and coupled across the input of the control circuit 26. The filter circuit comprises a pair of inductors 86 and 88 which are preferably wound on the same core and have the polarity indicated in FIG. 5. The inductors are also connected to each other at their output end by a coupling capacitor 90 to complete the radio-frequency suppression network. In operation, the suppression network 84 provides effective filtering of unwanted radio frequency signals by virtue of the fact that the capacitor interacts with each of the inductors 86 and 88, which are arranged to be 90° out of phase with respect to each other, as indicated by the polarity markings previously mentioned. Consequently, the capacitor 90 cooperates with each of the respective inductors 86 and 88 to effect suppression of unwanted signals regardless of the polarity of such signals.

It should be noted that the present adapter is suitable for use with any type of lamp socket or other type of electrical appliance in which continuously, selectively variable applied power to a load is desired. Similarly, the present adapter can be arranged to accomodate various types of loads, when such variable power is desired.

Although a preferred embodiment of the present invention has been described in detail, it should be understood that various modifications and changes will be readily apparent to one skilled in the art, and such changes and modifications are deemed to be within the spirit and scope of the invention.

What is claimed is:

1. An adjustable power control device of the type adapted to threadably engage a conventional electric lamp socket to which a source of electrical power is connectable for enabling the magnitude of the electrical power provided to an electric lamp to be selectively varied, said power control device comprising:

a generally tubular housing of electrically insulating material and having upper and lower ends, said housing being provided with a plurality of circumferentially spaced elongated slots therethrough arranged intermediate the ends of the housing and extending lengthwise thereof, a stationary support plate fixedly secured within said housing intermediate the ends thereof and defining a transverse partition within said housing disposed above the elongated slots therein, said support plate being provided with a plurality of radially spaced ventilating slots therethrough arranged between the central portion and the periphery of the support plate, an externally threaded base member fixedly secured to the lower end of said housing and providing a male connector for threadably connecting the control device to the electric lamp socket so as to enable the control device to be coupled to the source of electrical power through the electric lamp socket, an internally threaded upwardly opening socket member fixedly secured within said housing to the central portion of said support plate and disposed radially inwardly with respect to the housing wall and the ventilating slots in said support plate, said internally threaded socket member and said housing wall cooperating to define an annular passageway therebetween in registration with said ventilating slots, said internally threaded socket member providing a female connector for threadably receiving the electric lamp so as to enable the electric lamp to be coupled to the source of electrical power through the control device, a manually adjustable electric control circuit fixedly secured within said housing to the central portion of said support plate in depending relation therefrom, said electric control circuit being disposed within said housing at a location in registration with the elongated slots in said housing, said electric control circuit being electrically interconnected between said base member and said socket member to provide electrical coupling therebetween and being selectively adjustable for varying the magnitude of the electrical power to be provided to the electric lamp, a thumbwheel mounted within said housing for rotation with respect thereto about an axis transverse to the longitudinal extent of said housing, said thumbwheel being located in registration with one of the elongated slots in said housing and including a portion thereof protruding outwardly of said housing through said one elongated slot to enable the position of said thumbwheel to be manually adjusted.

means coupling said electric control circuit to said thumbwheel such that said electric control circuit is responsive to the rotation of said thumbwheel to vary the electrically conductive state of said electric control circuit for enabling the magnitude of the electrical power provided to the electric lamp to be selectively varied, and said elongated slots in said housing, said ventilating slots in said support plate, and said annular passageway defined between the housing wall and the radially inwardly disposed socket member cooperating to provide an unimpeded path for air flow extending through said housing supplying ventilation for said electric control circuit.

2. An adjustable power control device as set forth in claim 1, wherein said electric control circuit includes a bidirectional thyristor having a gate electrode, a bidirectional trigger diode coupled to said gate electrode, and an R-C phase adjusting network coupled to said trigger diode and connectable to the source of electrical power through the externally threaded base member of the control device, said R-C phase adjusting network including a potentiometer having a movable wiper arm for varying the resistance in the R-C network so as to vary the phase angle of electrical signals applied to said gate electrode through said trigger diode, and said coupling means between said electric control circuit and said thumbwheel connecting said thumbwheel to said wiper arm so that rotation of said thumbwheel causes the position of said wiper arm to be changed, thereby adjusting the electrically conductive state of said electric control circuit.

* * * * *